United States Patent
Cai et al.

(10) Patent No.: US 8,025,861 B2
(45) Date of Patent: Sep. 27, 2011

(54) MAKING ELECTROCATALYST SUPPORTS FOR FUEL CELLS

(75) Inventors: Mei Cai, Bloomfield Hills, MI (US); Yunfeng Lu, Los Angeles, CA (US); Zhiwang Wu, New Orleans, LA (US); Lee Lizhong Feng, Troy, MI (US); Martin S. Ruthkosky, Sterling Heights, MI (US); John T. Johnson, Sterling Heights, MI (US); Frederick T. Wagner, Fairport, NY (US)

(73) Assignees: GM Global Technology Operations LLC, Detroit, MI (US); Administrators of the Tulane Educational Fund, New Orleans, LA (US)

( * ) Notice: Subject to any disclaimer, the term of this patent is extended or adjusted under 35 U.S.C. 154(b) by 0 days.

(21) Appl. No.: 12/716,360

(22) Filed: Mar. 3, 2010

(65) Prior Publication Data

US 2010/0160153 A1   Jun. 24, 2010

Related U.S. Application Data

(62) Division of application No. 11/462,739, filed on Aug. 7, 2006, now abandoned.

(60) Provisional application No. 60/707,937, filed on Aug. 12, 2005.

(51) Int. Cl.
*C01G 23/04* (2006.01)
*C01G 23/00* (2006.01)
*C01G 23/53* (2006.01)
*B01J 23/00* (2006.01)
*C01J 23/47* (2006.01)

(52) U.S. Cl. ........... 423/610; 423/594.17; 423/594.13; 423/598; 423/599; 423/608; 423/609; 502/101; 502/339; 502/350

(58) Field of Classification Search .......... 423/608–610, 423/594.8, 594.13, 598, 599, 594.17; 502/101, 502/339, 350; *B01J 23/00; C01G 23/47, C01G 23/04, 23/53, 31/00, 33/00*
See application file for complete search history.

(56) References Cited

U.S. PATENT DOCUMENTS

| | | | |
|---|---|---|---|
| 5,021,304 A | 6/1991 | Ruka et al. | |
| 6,191,067 B1 * | 2/2001 | Koike et al. | 502/350 |
| 6,478,994 B1 * | 11/2002 | Sneddon et al. | 264/43 |
| 6,827,922 B2 * | 12/2004 | Sawabe et al. | 423/610 |
| 2003/0064265 A1 * | 4/2003 | Hampden-Smith et al. | 429/30 |

FOREIGN PATENT DOCUMENTS

| | | |
|---|---|---|
| CN | 1348834 | 5/2002 |
| JP | 2116603 | 5/1990 |

OTHER PUBLICATIONS

Zhang et al, Langmuir, 20, 2004: 11313-11314.*
Jiang (Science, 2001, 291:453-457).*
Chen et al (Journal of the electrochemical society, 2002, 149:A1092-1099).*
Kim (Journal of Materials Research, 18, 2003:780-783).*
Morris et al (Physical Review B, 61, 2000:13445-13457).*
International Search Report for application No. PCT/US 06/30921 dated Jun. 3, 2008.
Written Opinion for application No. PCT/US 06/30921 dated Jun. 3, 2008.
Ziyi Zhong et al., Preparation of Mesoscale Hollow Spheres of TiO2 and SnO2 by Templating Against Crystalline Arrays of Polystyrene Beads; Wiley-VCH Verlag GmbH, D-69469 /Weinheim 2000; Advanced Materials; 2000 12, No. 3.

* cited by examiner

*Primary Examiner* — Melvin Mayes
*Assistant Examiner* — Jun Li
(74) *Attorney, Agent, or Firm* — Reising Ethington P.C.

(57) ABSTRACT

Titanium oxide (usually titanium dioxide) catalyst support particles are doped for electronic conductivity and formed with surface area-enhancing pores for use, for example, in electro-catalyzed electrodes on proton exchange membrane electrodes in hydrogen/oxygen fuel cells. Suitable compounds of titanium and a dopant are dispersed with pore-forming particles in a liquid medium. The compounds are deposited as a precipitate or sol on the pore-forming particles and heated to transform the deposit into crystals of dopant-containing titanium dioxide. If the heating has not decomposed the pore-forming particles, they are chemically removed from the, now pore-enhanced, the titanium dioxide particles.

17 Claims, No Drawings

MAKING ELECTROCATALYST SUPPORTS FOR FUEL CELLS

This application is a divisional of U.S. patent application Ser. No. 11/462,739 filed on Aug. 7, 2006. This application claims the benefit of U.S. Provisional Patent Application Ser. No. 60/707,937 filed on Aug. 12, 2005, which is incorporated herein by reference.

TECHNICAL FIELD

This invention pertains to electrode catalysts for fuel cells. More specifically, this invention pertains to corrosion resistant catalyst supports for fuel cells, especially for cells having a cathode at which oxygen is reduced in air.

BACKGROUND OF THE INVENTION

Fuel cells are electrochemical cells that are being developed for mobile and stationary electric power generation. One fuel cell design uses a solid polymer electrolyte (SPE) membrane or proton exchange membrane (PEM), to provide ion transport between the anode and cathode. Gaseous and liquid fuels capable of providing protons are used. Examples include hydrogen and methanol, with hydrogen being favored. Hydrogen is supplied to the fuel cell anode. Oxygen (as air) is the cell oxidant and is supplied to the cell's cathode. The fuel cell electrodes are formed of porous conductive materials, such as woven graphite, graphitized sheets, or carbon paper to enable the fuel to disperse over the surface of the membrane facing the fuel supply electrode. Each electrode comprises finely divided catalyst particles (for example, platinum particles), supported on carbon particles, to promote ionization of hydrogen at the anode and reduction of oxygen at the cathode. Protons flow from the anode through the ionically conductive polymer membrane to the cathode where they combine with oxygen to form water, which is discharged from the cell. Conductor plates carry away the electrons formed at the anode.

Currently, state of the art PEM fuel cells utilize a membrane made of perfluorinated ionomers such as Dupont NAFION®. The ionomer carries pendant ionizable groups (e.g. sulfonate groups) for transport of protons through the membrane from the anode to the cathode.

Currently, platinum (Pt) supported on a high surface area carbon is the most effective electrocatalyst for PEM fuel cell systems. However, a significant problem hindering large-scale implementation of proton exchange membrane (PEM) fuel cell technology is the loss of performance during extended operation and automotive cycling. Recent investigations of the deterioration of cell performance have revealed that a considerable part of the performance loss is due to the degradation of the electrocatalyst. Although carbon has been considered as the most favorable catalyst support because of its low cost, good electron conductivity, high surface area, and chemical stability, corrosion of carbon supports on the cathode side of PEM fuel cells is emerging as a challenging issue for long-term stability of PEM fuel cells.

It is an object of this invention to provide a porous titanium oxide electrocatalyst support having suitable properties for a PEM fuel cell environment including suitable surface area, electrical conductivity and chemical stability.

SUMMARY OF THE INVENTION

This invention uses a porous form of titanium dioxide (sometimes called "titania") as a high surface area support for platinum, or other suitable catalyst. Preferably, the titanium dioxide is mixed or doped with an element such as niobium to enhance the electrical conductivity of the support material. The titanium oxide is formed around removable filler particles (particulate templates), such as silica particles, that are chemically dissolved (etched) from the titanium dioxide particles to yield highly porous catalyst particle carriers. Particles of noble metal or other catalyst material are then deposited on the porous carrier material. Such a titanium dioxide carrier material is particularly useful in a catalytic electrode material in association with a proton exchange membrane in a fuel cell in which oxygen is electrochemically reduced.

In accordance with a preferred embodiment of the invention, a titanium alkoxide compound is formed as a solution or sol in an alcohol or aqueous/alcohol medium. For example, a solution or sol of titanium (IV) isopropoxide or titanium (IV) 2-ethylhexyloxide may be formed. A salt or alkoxide of a suitable dopant element may also be dissolved or dispersed in the medium. Examples of suitable dopant elements include lanthanum, manganese, molybdenum, niobium, tantalum, tungsten, strontium, vanadium, and yttrium. Also dispersed in the liquid medium are suitably sized particles (e.g. less than twenty nanometers in greatest dimension) of silica, polymer beads, or the like (preferably with the aid of ultrasonic energy). The titanium and dopant element compounds are then precipitated or gelled on the dispersed particles.

The gelled or precipitated composite material is separated from the liquid medium and dried as necessary. The composite material is heated to a suitable temperature in a controlled atmosphere, for example of hydrogen or ammonia, to form very small particles (nanometer size) of titanium dioxide doped with a suitable quantity of niobium, or the like. When the template particles consist of an organic polymer they may be removed by heating to leave pores in the agglomerated particles of titania. When the template particles are inorganic, like silica, they may be chemically dissolved from the titanium dioxide particles leaving internal and external surface pores for receiving and dispersing fine particles of catalyst metal.

The porous and doped titanium dioxide particles provide ample surface for the effective dispersion of platinum particles for use as cathodic electrode material on a NAFION® proton exchange membrane in a hydrogen/oxygen fuel cell environment. The titania carrier resists oxidative weight loss in a high temperature air environment and displays electrical conductivity.

Other objects and advantages of the invention will be apparent from a detailed description of illustrative preferred embodiments.

DESCRIPTION OF PREFERRED EMBODIMENTS

The titanium dioxide catalyst support materials of this invention have general utility in catalyst applications. Their utility includes applications as catalyst supports for catalyst particles in fuel cell electrodes. For example, these durable catalyst supports may be useful in an electrochemical fuel cell assembly including a solid polymer electrolyte membrane and a cathode that is exposed to oxygen or air. Many United States patents assigned to the assignee of this invention describe electrochemical fuel cell assemblies having an assembly of a solid polymer electrolyte membrane and electrode assembly. For example, FIGS. 1-4 of U.S. Pat. No. 6,277,513 include such a description, and the specification and drawings of that patent are incorporated into this specification by reference. In the '513 patent, carbon particles are used to carry or support catalyst particles for electrode (anode or cathode) operation. In this invention, porous and doped titanium dioxide particles are used to carry the catalyst for the electrode function.

Compounds of titanium (IV) alkoxides, such as titanium (isopropoxide)$_4$ or titanium (2-ethylhexyloxide)$_4$, are readily available and are, therefore, suitable and even preferred for use in the practice of this invention. These compounds have suitable solubility in alcohol (ethanol) for use in this method. As summarized above, suitable dopant elements include lanthanum, manganese, molybdenum, niobium, tantalum, tungsten, strontium, vanadium, and yttrium. Atoms of the dopant element(s) may be added to promote electronic conductivity by introducing defects in the crystalline titanium oxide support material. The dopant(s) is suitably added in an amount up to about half of the atoms of titanium in the support material. Alkoxide compounds or salts of these dopant elements are available and may be used for introducing one or more dopant element(s) into the titanium oxide catalyst support particles.

For example, titanium (IV) isopropoxide and niobium (V) chloride, or niobium (V) ethoxide, are dissolved in ethanol in proportions of two atomic parts titanium per atom of niobium. Silica particles (10-15 nm in largest dimension) are dispersed in the alcohol solution or sol of titanium and niobium compounds. Silica is suitably added to the sol in an amount to provide about 1.2 parts by weight of silicon per part of titanium. As an alternative nanometer size particles of nylon or vinyl chloride may be used as pore-forming templates in the dispersion. The uniformity of mixing of the constituents of the dispersion may be enhanced by sonic vibration of the dispersion.

The solution (sol) is then acidified with aqueous hydrochloric acid to hydrolyze the titanium and niobium compounds and form a gel or precipitate of titanium-containing and niobium-containing material entraining the silica particles. The titanium containing material contains sufficient oxygen for the formation of titanium dioxide.

The precipitate or gel is separated from the liquid medium and dried. The solid material is then heated to about 1000° C. in an atmosphere of hydrogen (or suitably, ammonia) so as to form crystalline titanium dioxide doped with elemental niobium. The particles of titanium dioxide are very small, nanometer size, and the particles of silica are dispersed in the doped titanium dioxide.

The niobium doped oxide particles are chemically etched with aqueous sodium hydroxide or hydrogen fluoride to remove the pore-forming silica particles. The residue of the chemical etching is a mass of very small, pore containing, Nb-doped, TiO$_2$ particles where the pores are formed principally by the removal of the silica particles.

In a specific experimental example, the resulting porous TiO$_2$ was crystalline, contained Ti/Nb in an atomic ratio of 2, and had a BET surface area of 125 m$^2$/g.

In a continuation of the experimental illustration, Pt was deposited on this Nb-doped TiO$_2$ using an aqueous solution of diamineplatinum (II) nitrite, Pt(NO$_2$)$_2$(NH$_3$)$_2$, as a precursor. The Nb-doped TiO$_2$ was dispersed in water at 80° C. using ultrasonic energy. The platinum precursor was also separately dissolved in 70-80° C. water with stirring. The TiO$_2$ dispersion and the platinum precursor solution were mixed. The pH of the resulting platinum deposition medium was adjusted to 3.0 using acetic acid and carbon monoxide gas was diffused through the medium at a rate of two liters per minute. The reaction medium was stirred at 90° C.

Hydrazine hydrate was used for reduction of the platinum and its deposition as very small particles on the niobium-doped TiO$_2$ particles. Hydrazine hydrate was added drop wise with stirring to the platinum deposition medium (at 90° C., pH 3, and with CO diffusion) over a period of one hour. Then the TiO$_2$-containing medium with deposited platinum was cooled to room temperature. The reaction product of platinum deposited on niobium-doped titanium dioxide particles was filtered through a 0.45 micrometer pore-size cellulose nitrate membrane, washed with distilled water, and dried overnight in a vacuum oven at 50° C.

In this example platinum was deposited at 72 weight percent on porous niobium doped titanium dioxide and the resulting catalyst was tested with a gas phase accelerated thermal sintering method intended to induce oxidative corrosion of the catalyst. The test was conducted at 250° C. for 30 hours under an atmosphere, by volume, of 0.7% O$_2$, 8% H$_2$O, and the balance helium. Two commercial platinum-on-carbon catalysts were subjected to the same corrosion testing for comparison. Table 1 records the mass loss resulting from the platinum-on-titanium dioxide catalyst produced in accordance with this invention and the two comparison carbon supported platinum catalysts.

TABLE 1

Mass Loss Comparison

| Catalysts | Pt loading | Mass Loss |
|---|---|---|
| Pt/TiO$_2$ (no Nb) | 42% | −1.1% |
| Pt/TiO$_2$ (Nb/Ti = 1/2) | 72% | −4.4% |
| Pt on carbon (1) | 46.6% | −55.8% |
| Pt on carbon (2) | 45.9% | −76.2% |

It is seen that the titanium oxide supported catalysts survives an oxidizing environment better than the carbon supported catalyst.

The above porous, niobium-doped titanium oxide supported platinum catalyst was further tested for its oxygen reduction activity. The catalyst sample was prepared for electrochemical measurement by a special method (mixing and sonication in a suspension) to form an ink for application to a rotating disk electrode (RDE). The suspension contained the platinum on doped-titanium dioxide support (designated 41305 TJ) and a commercial electrically conductive particulate carbon dispersed in isopropanol and water. The dispersion also contained a 5% solution of NAFION® ionomer in water.

The supported platinum and carbon containing mixture was put into a sealed 60 ml glass bottle. The content was subsequently mixed by shaking and sonicated for 2-4 hours. Once a homogeneous ink suspension was formed, 10-20 micro liters of the suspension were dispensed on a glassy carbon electrode surface. After drying at room temperature, the electrode was put on the Rotating Disk Electrode (RDE) device for activity measurement (in micro-amperes per square centimeter of platinum at 0.9V). The resulting dried catalyst on the electrode contained 52.6 wt. % Pt.

A sample of platinum on non-doped TiO$_2$ was prepared for comparison testing. The platinum on non-doped TiO$_2$ (sample 0131005TJ) was applied as in ink to a RCE for comparative electrode activity measurement by the technique described above. Also, a second platinum on niobium-doped TiO$_2$ catalyst was prepared (sample 061705KV). This sample contained niobium in an amount of 5% of the titanium and the platinum loading on the electrode was lower (33.4%) than sample 131005TJ.

In the electrode activity tests the electrode was rotated at 1600 RPM in the 0.1M HClO$_4$ electrolyte at 60° C. with a flowing, saturated oxygen atmosphere at one atmosphere. The electrode voltage scan rate was 5 mV/s over a voltage range of 0-1V.

Table 2 summarizes the specific oxygen reduction activities of two illustrative platinum-on-doped titanium dioxide support catalysts and like data obtained using the non-doped $TiO_2$ sample and two commercial platinum-on-carbon comparison catalysts.

TABLE 2

| Catalyst | Pt (wt %) | Type | Specific activity (uA/cm² Pt at 0.90 V) |
|---|---|---|---|
| 0131005TJ | 27.8 | Pt/TiO₂ (no Nb) | 153 |
| 041305TJ | 52.6 | Pt/Nb—TiO₂ (1:2) | 548 |
| 061705KV | 33.4 | Pt/Nb—TiO₂ (5%) | 494 |
| Pt/C (3) | 46.4 | Pt Co/C | 298 |
| Pt/C (4) | 46.5 | Pt/HSC | 172 |

It is seen that the niobium-doped titanium support particles with platinum catalyst provided highly suitable specific electrode activity in the tests. The specific activities of the tow samples in uA/cm² Pt at 0.90V were higher than either of the platinum on carbon electrocatalysts or the platinum on non-doped $TiO_2$ electrode material.

While the invention has been illustrated by certain preferred embodiments, these illustrations are intended to be non-limiting.

The invention claimed is:

1. A method of making catalyst support particles comprising:
   co-dispersing compounds of titanium and a salt or alkoxide of a dopant element as solutes or a sol in a liquid alcohol or water/alcohol_medium, the dopant element being selected to enhance the electrical conductivity of the catalyst support particles;
   dispersing insoluble pore-forming particles in the liquid alcohol or water/alcohol medium using ultrasonic vibration of the medium, the pore-forming particles being no larger than about twenty nanometers in largest dimension;
   precipitating the dispersed compounds of titanium and dopant element on the pore-forming particles;
   separating the precipitate from the liquid alcohol or water/alcohol medium;
   heating the precipitate in a controlled atmosphere to form crystalline, dopant element-containing titanium dioxide particles; and
   removing the embedded pore-forming particles from the crystalline, dopant element-containing titanium dioxide particles to leave surface-area increasing internal and external pores in the crystalline, dopant element-containing titanium dioxide particles.

2. A method as recited in claim 1 in which removing the embedded pore-forming particles comprises chemically etching the embedded pore-forming particles.

3. A method as recited in claim 2 in which the chemically etching is performed with aqueous sodium hydroxide or hydrogen fluoride.

4. A method as recited in claim 1 in which removing the embedded pore-forming particles comprises heating the embedded pore-forming particles.

5. A method as recited in claim 1 in which heating the precipitate in a controlled atmosphere comprises heating to about 1000° C.

6. A method as recited in claim 1 in which the titanium compound is a titanium (IV) alkoxide compound.

7. A method as recited in claim 6 in which the titanium compound is titanium (IV) isopropoxide or titanium (IV) 2-ethylhexyloxide.

8. A method as recited in claim 1 in which the insoluble pore-forming particles are at least one of silica particles, polymer particles, nylon particles, or vinyl chloride particles.

9. A method as recited in claim 8 in which the insoluble pore-forming particles are silica particles, and in which the silica particles are dispersed in the liquid alcohol or water/alcohol medium in an amount to provide about 1.2 parts by weight of silicon per part of titanium.

10. A method as recited in claim 1 in which the insoluble pore-forming particles are 10-15 nanometers in largest dimension.

11. A method as recited in claim 1 in which the electrical conductivity-enhancing dopant element comprises one or more elements selected from the group consisting of lanthanum, manganese, molybdenum, niobium, tantalum, tungsten, strontium, vanadium, and yttrium.

12. A method as recited in claim 11 in which the electrical conductivity-enhancing dopant element is niobium.

13. A method as recited in claim 1 in which the controlled atmosphere comprises hydrogen or ammonia.

14. A method as recited in claim 1 in which the dopant electrical conductivity-enhancing element is niobium, the catalyst support particles contain Ti/Nb in an atomic ratio of 2, and the catalyst support particles have a BET surface area of 125 m²/g.

15. A method of making a catalyst for an electrode for a fuel cell comprising:
   co-dispersing compounds of titanium and a salt or alkoxide of a dopant element as solutes or a sol in a liquid alcohol or water/alcohol_medium, the dopant element being selected to enhance the electrical conductivity of the catalyst;
   dispersing insoluble pore-forming particles in the liquid alcohol or water/alcohol medium using ultrasonic vibration of the medium, the pore-forming particles being no larger than about twenty nanometers in largest dimension;
   precipitating the dispersed compounds of titanium and dopant element on the pore-forming particles;
   separating the precipitate from the liquid alcohol or water/alcohol medium;
   heating the precipitate in a controlled atmosphere to form crystalline, dopant element-containing titanium dioxide particles;
   removing the embedded pore-forming particles from the crystalline, dopant element-containing titanium dioxide particles to leave surface-area increasing internal and external pores in the crystalline, dopant element-containing titanium dioxide particles; and
   depositing catalyst particles on the crystalline, dopant element-containing titanium dioxide particles to form the catalyst for an electrode for a fuel cell.

16. A method as recited in claim 15 in which the catalyst particles are a noble metal.

17. A method as recited in claim 15 in which the catalyst particles are platinum.

* * * * *